Feb. 8, 1955  J. W. BALL  2,701,387
METHOD FOR STRIPPING AND REMOVING
ARTIFICIAL CASING FROM SAUSAGE
Original Filed Jan. 7, 1950  5 Sheets-Sheet 1

INVENTOR.
James W. Ball
BY
Dos J. Hatfield
ATTORNEY

Feb. 8, 1955
J. W. BALL
2,701,387
METHOD FOR STRIPPING AND REMOVING
ARTIFICIAL CASING FROM SAUSAGE
Original Filed Jan. 7, 1950
5 Sheets-Sheet 2
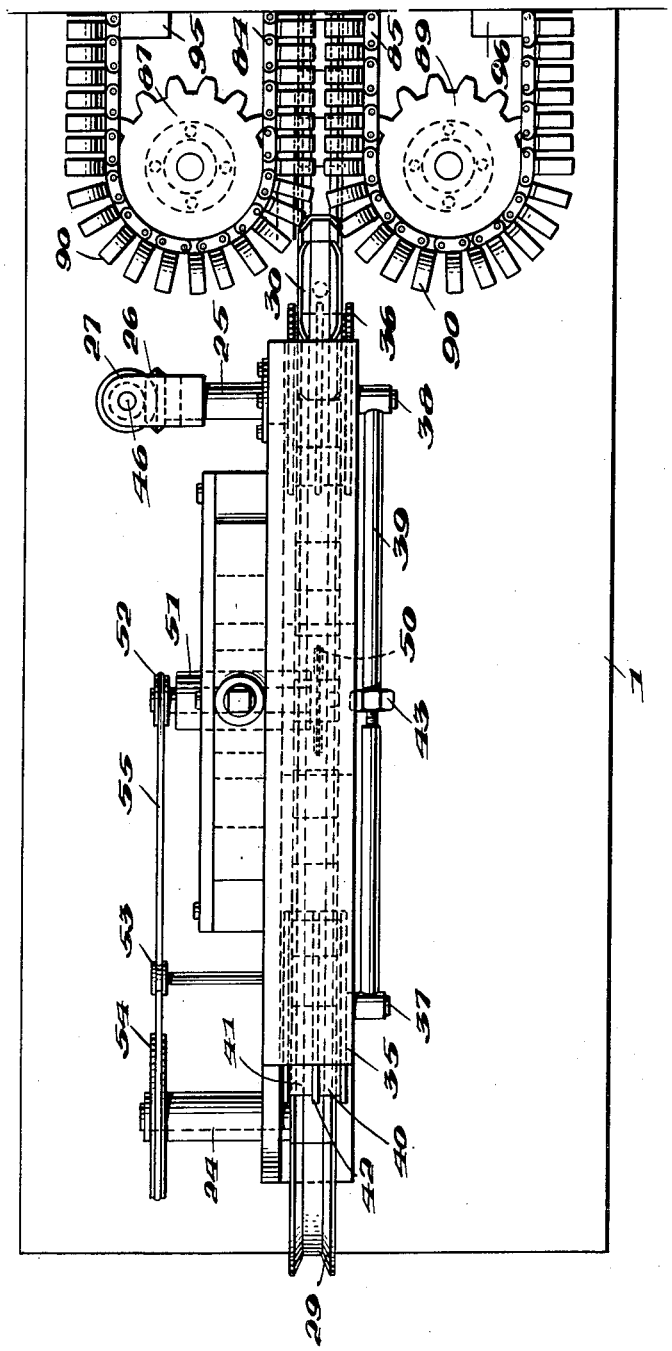
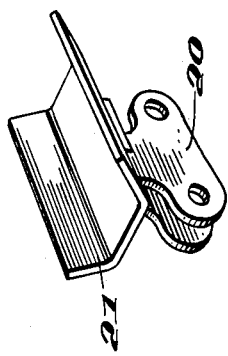
INVENTOR.
James W. Ball
BY
Dos J. Hatfield
ATTORNEY

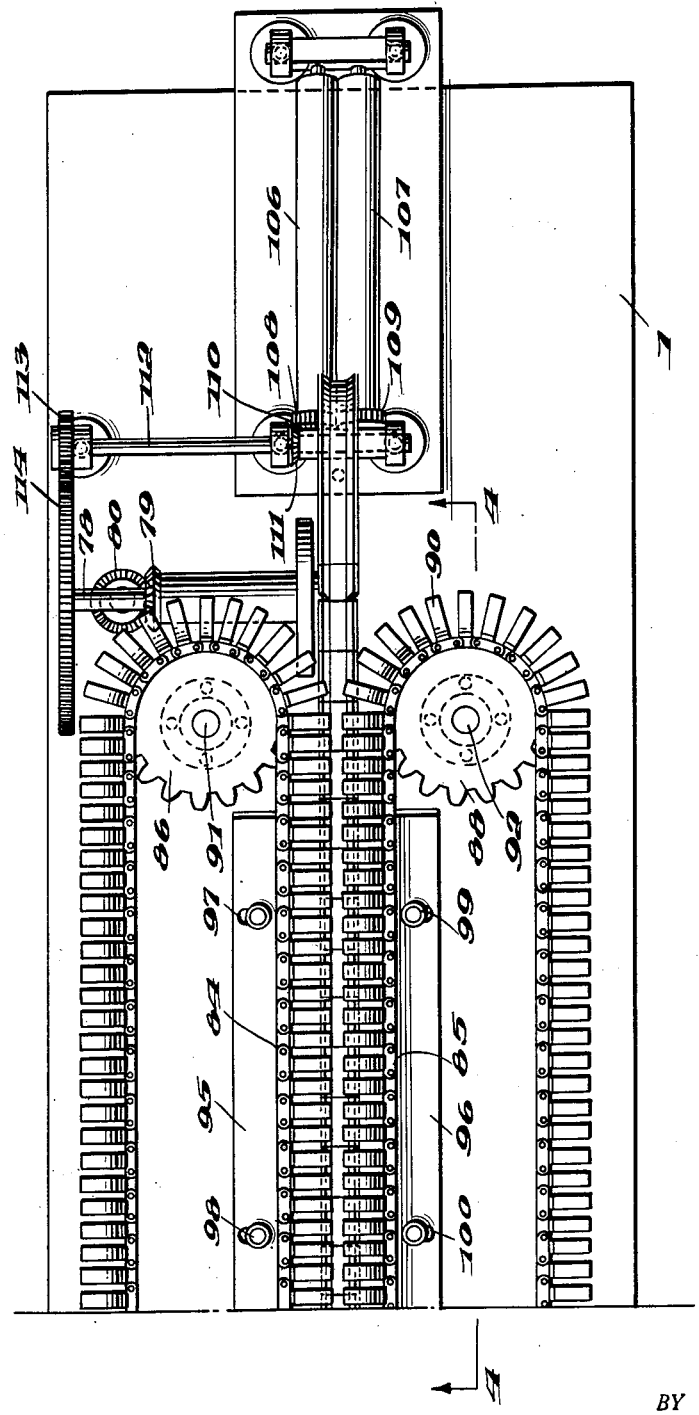

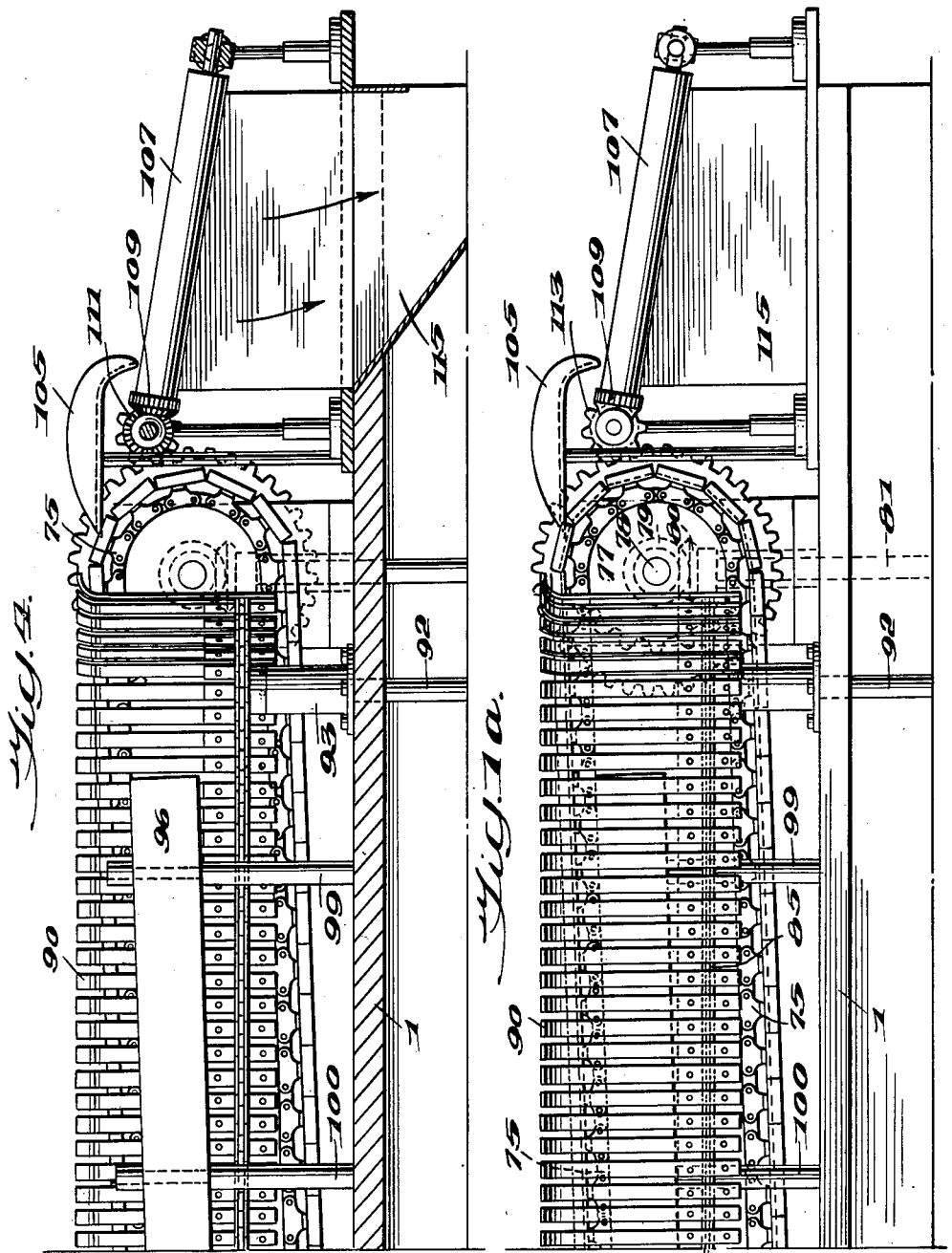

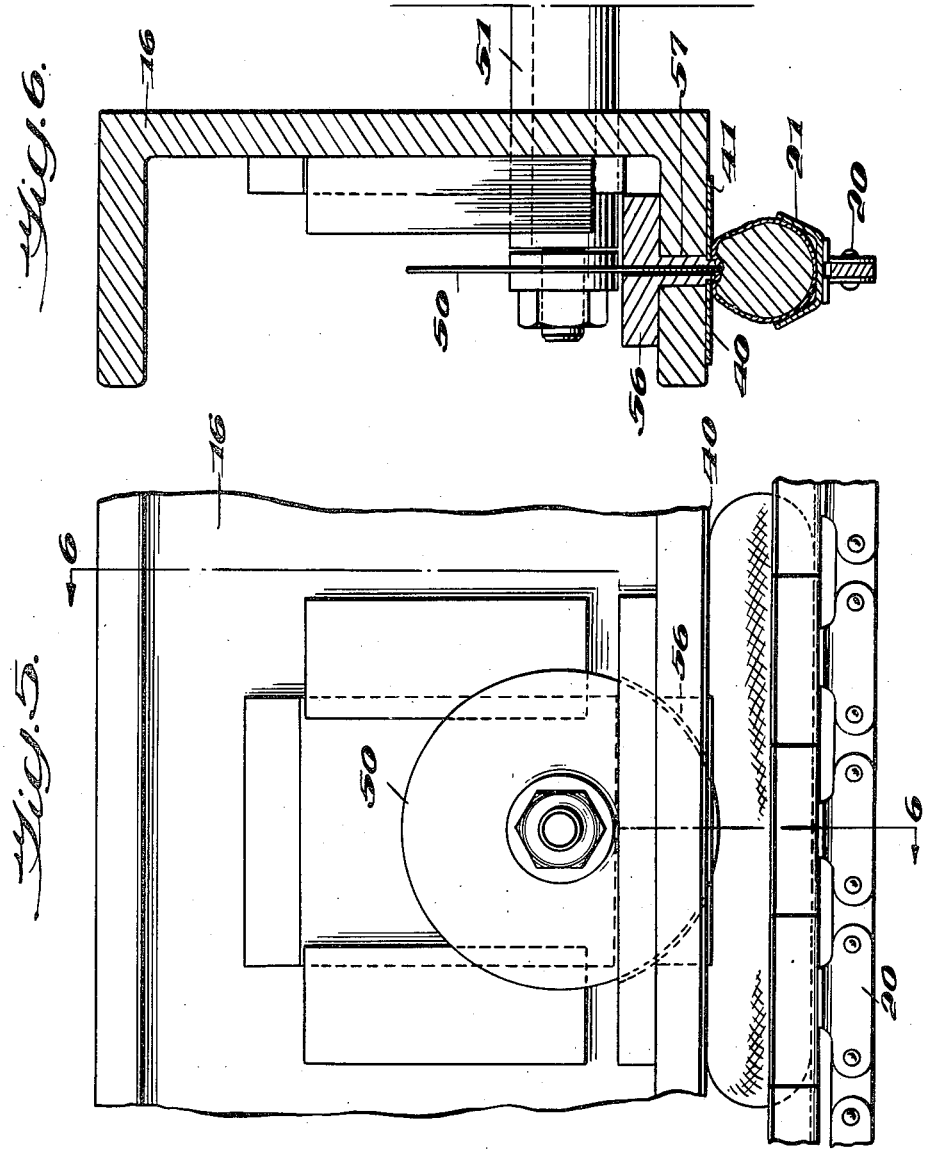

United States Patent Office 2,701,387
Patented Feb. 8, 1955

2,701,387
METHOD FOR STRIPPING AND REMOVING ARTIFICIAL CASING FROM SAUSAGE

James W. Ball, Dallas, Tex., assignor of ten per cent to A. P. Broiles, Dallas County, forty-five per cent to Willard R. Gunderson, Dallas County, and ten per cent to Ralph R. Gunderson, Dallas, Tex.

Original application January 17, 1950, Serial No. 139,022, now Patent No. 2,644,979, dated July 14, 1953. Divided and this application July 10, 1953, Serial No. 367,258

4 Claims. (Cl. 17—45)

The present invention relates to skinless sausage making, and more particularly to a method for stripping and removing the artificial casing preliminarily used in the preparation of skinless sausage.

In one known procedure for the manufacture of skinless sausage, the meat is first packed in an artificial and usually inedible casing such as a cellophane type continuous tube. At intervals determined by the desired length of sausage, the tubing is twisted down to form a link between individual sausages. The stuffed casing is then submitted to sausage processing operations such as dyeing, smoking and chilling. As a final step in preparing the sausage for market, the processed sausage must be removed from within the casing by stripping the casing from the prepared sausage.

It is a principal object of this invention to provide an improved method for continuously stripping the artificial casing from prepared sausage in the production of skinless sausage.

One of the important objects of this invention is to provide an improved sausage casing stripping method that will enable the artificial casing to be continuously stripped from prepared sausage of varying length.

Another object of this invention is to provide a sausage casing stripping method for stripping the casing in a rapid and thorough manner and readily adaptable to various sizes of sausages.

Yet another object of this invention is to provide a sausage casing stripping method for sausage sizing and cutting or slitting that does not cut or score the sausage meat.

The proposed casing stripping method of this invention includes the steps of first slitting the casing longitudinally of the sausage, thereafter frictionally engaging or gripping the casing by a cross-sweeping motion with the encased sausage string moving on an inclined axis between gripping members to strip the casing from the sausage, and finally mechanically separating the stripped casing and skinless sausage. The method of this invention may further include the additional step of compressing the sausage to a predetermined size beneath a cutting element so that precise slitting of the casing is obtained without scoring the sausage meat.

In its preferred embodiment, the sausage casing stripping method of this invention is carried out by a plurality of continuous conveyors for conveying a string of prepared sausage meat and casing, firstly, past a sausage sizing and casing slitting knife, secondly, between a plurality of resilient friction gripping and stripping fingers in a manner to cross-sweep the slit casing from around the sausage meat, and, lastly, to a pair of co-acting rollers so arranged as to finally separate the stripped artificial casing from the prepared skinless sausage. The sizing mechanism and slitting knife may be relatively adjustable to precisely determine the depth of the slit with regard to a known thickness of sausage casing, and the entire mechanism, including both the sizing mechanism and the slitting knife, is adjustable with respect to the sausage conveyor in order that the machine may accommodate sausages of different diameters. The plurality of sausage conveyors are preferably comprised of a plurality of flexible chain links that are provided with especially shaped pan surfaces to support and convey a sausage body. In the stripping portion of the machine, the sausage conveyor is adapted to move the sausage in an inclined path between a pair of opposed endless belts having a plurality of resilient fingers frictionally engaging the sausage casing. By suitably adjusting the relative speeds of the inclined sausage conveyor and the opposed endless belts, the desired amount of cross-sweep action for stripping the sausage casing may be obtained so that efficient operation can be realized with only a single longitudinal slit of the sausage casing. The invention may further provide an adjustment of the friction grip of the stripping fingers. In the final stage of the machine, the stripped casing is crushed and fed between a pair of counter-rotating coacting rollers mounted on an inclined axis so that the skinned sausage now completely separated from the artificial casing can move forward into a collection receptacle or upon a subsequent packaging conveyor.

For a more detailed description of the present invention, reference will be made to the following specification and drawings, in which:

Figures 1 and 1a show a continuous side elevation of the entire machine;

Figures 2 and 2a show a continuous top plan view of the entire machine;

Figure 3 is a detail perspective of the conveyor link used in either of the sausage conveyors;

Figure 4 is a partial section of the lines 4—4 of Figure 2a;

Figure 5 is a fragmentary detail of the casing slitting mechanism generally shown in Figure 1; and Figure 6 is a cross section on the lines 6—6 of Figure 5.

Figure 1:
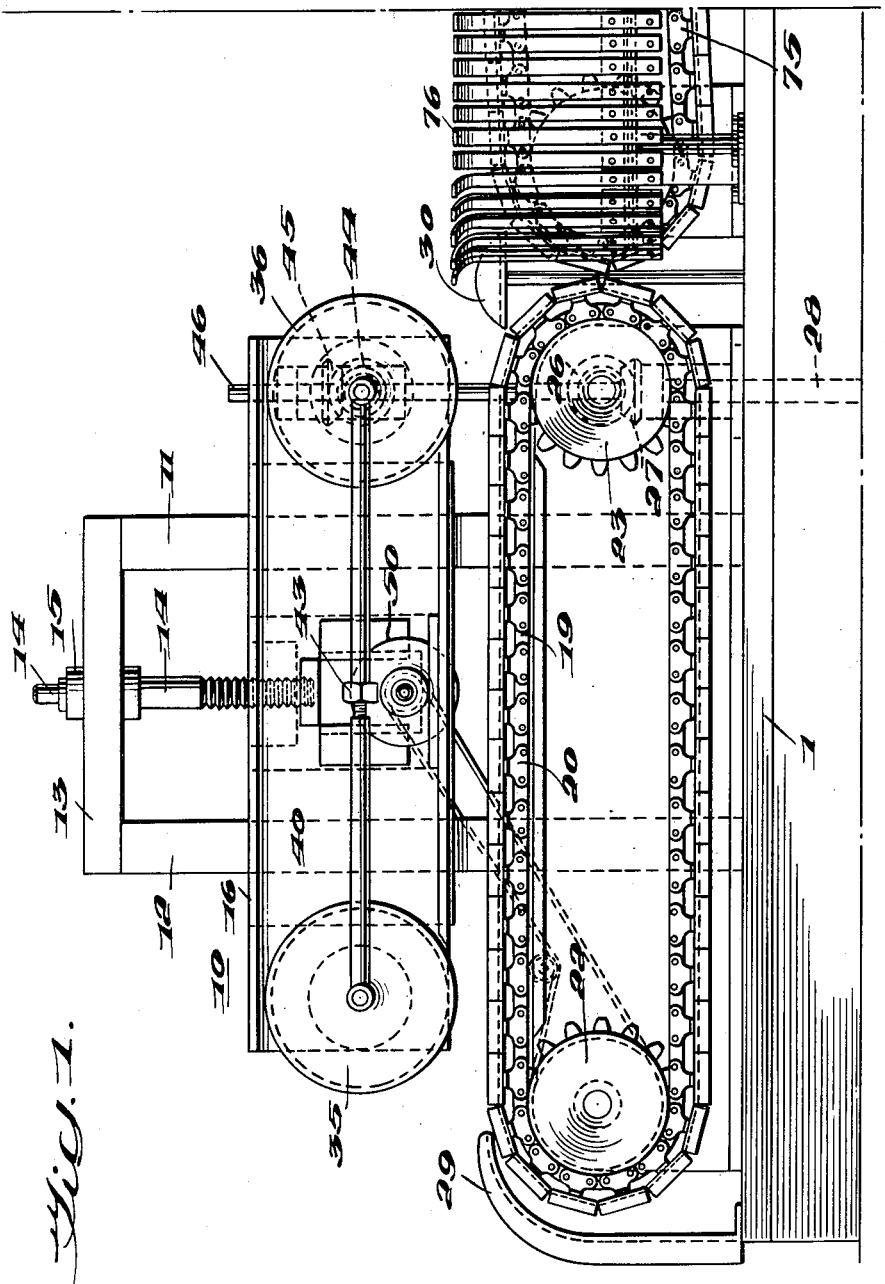

The sausage sizing and casing slitting knife will first be described in connection with Figures 1, 2, 5 and 6 of the drawings. It should, of course, be understood that the entire machine is mounted upon a suitable supporting base or framework 1 (not shown in detail). The entering end of the machine is shown in Figures 1 and 2 of the drawings. The sausage sizing and casing slitting mechanism is generally shown at 10 and is adjustably mounted to the upright frame supporting members 11, 12 and 13 by the depending threaded spindle 14, rotatably journalled at 15 in the frame member 13. The lower end of the spindle 14 is threaded into a suitable nut fixed to the back of the channel frame member 16 carrying the sizing mechanism and slitting knife. A cross section of the channel frame member 16 is shown in Figure 6 of the drawing. By rotating the spindle 14, the entire sausage sizing and casing slitting mechanism may be raised or lowered to accommodate different sausage diameters.

The lower part of the mechanism shown in Figure 1 comprises an endless chain conveyor 19 having a plurality of chain links 20, shown in detail by Figure 3 to have affixed thereto the pan shaped surfaces 21 for supporting and conveying the sausage. The chain conveyor 19 is carried in suitable chain sprockets 22 and 23 that are journalled in suitable bearings 24 and 25 on the machine framework (see Fig. 2). The chain sprocket 23 is driven by the bevel gears 26 and 27 from the shaft 28 whose source of power will be referred to later in the specification. A curved metal trough 29 is provided to guide the entering encased string of prepared sausage, and a fixed transfer guide trough 30 is provided to transfer the sausage string to the second endless conveyor in the casing stripping section of the machine to be later described.

Rotatably mounted on each end of the channel member 16, as shown in Fig. 1, are the double-faced pulleys 35 and 36. The pulleys 35 and 36 are carried on axle members 37 and 38, respectively, which may have a limited adjustment relative to each other as determined by the threaded separating bar 39. Each face of the pulleys 35 and 36 carries an endless metallic band 40 and 41, respectively, which are therefore spaced apart by the pulley double-face separating ridge 42. The metallic bands 40 and 41 are also shown in Figures 5 and 6 of the drawings. By adjusting the nut 43, the tension on the bands 40 and 41 may be regulated, as will be obvious. Pulley 36 is adapted to be rotated to provide movement of the bands 40 and 41 in the direction away from the entering end of the machine simultaneously with a similar movement of the sausage conveyor 19, and bevel gears 44 and 45 connected to shaft extension 46 of shaft 28 are provided for that purpose. In operation, the metal bands 40 and 41, as shown in Figure 6 of the drawings, function to compress and size the sausage preparatory to slitting the sausage casing, so that only the sausage casing will be slit by the knife. It should now be apparent that an adjustment of the spindle 14 is required to raise or lower the frame member 16 in order to adjust the sizing bands 40 and 41 and the slitting knife for different sausage sizes.

A rotatable cutting or slitting knife 50, shown in Figures 1, 2, 5 and 6 of the drawings, is journalled in a bearing member 51 carried on the frame member 16 but vertically adjustable to a limited extent in any suitable manner (not shown). The knife 50 may be rotated by means of the pulleys 52, 53, 54 and belt 55 as driven from the shaft of the conveyor sprocket 22. As shown in detail in Figure 6, the knife blade 50 passes through a slot in a gauging shoe 56 which also functions to engage and depress the sausage and casing so that a cut of precise depth is made in the sausage casing only. By adjusting the vertical height of the knife axis, the relative spacing between the gauging shoe 56 which extends at 57 through the frame member 16 and the cutting edge of the knife 50 may be adjusted for sausage casings of different thicknesses, so that the sausage meat will not be scored by the cutting knife.

Now, referring to Figures 1, 1a and 2, 2a of the drawings, a description of the casing stripping portion of the machine will be made. A sausage conveyor 75, similar to the conveyor 19, is provided to convey the string of slitted sausage casing and sausage on an inclined path. The chain conveyor 75 is driven by the chain sprockets 76 and 77, suitably journalled on the machine framework. Sprocket 77 is carried on a shaft 78 driven by bevel gears 79 and 80 from shaft 81 interconnected to a suitable source of power with shaft 28.

The inclined conveyor 75 passes between the opposing runs of endless conveyors 84 and 85 which are carried by chain sprockets 86, 87, 88 and 89, respectively, mounted on vertical spindle axes on the machine frame 1. Each of the chain links of the conveyors 84 and 85 is provided with an upwardly extending spring finger 90 shaped as shown to frictionally and resiliently engage the sausage casing as the string of sausage is conveyed from the cutting mechanism. Sprockets 86 and 88 are keyed to shafts 91 and 92, respectively, extending through the vertical bearings such as 93 and the machine base to the source of power connected with shafts 28 and 81, so that the strip finger conveyors will be moved in the same direction as the sausage conveyor 75 towards the discharge end of the machine. It is preferable that the speed of the strip conveyors be adjustable to a lower speed with respect to the speed of the inclined conveyor 75 in order that a desired amount of cross-sweep stripping action on the sausage casing may be obtained. To this end, any suitable variable speed transmission may be interposed in the connection between shafts 91 and 92 and the power source.

In order to vary the gripping force of the spring fingers 90, a pair of movable abutment blocks 95 and 96 having side portions bearing against the backs of the spring finger 90 are mounted on vertical extending supports 97, 98, 99 and 100. The supports 97–100 pass through suitable slotted holes in the respective abutments 95 and 96 so that the abutments may be adjusted to or from each other to thus move the spring fingers 90 of the respective strip conveyors 84 and 85 to or from each other and thus vary the amount of gripping action that functions to strip sausage casing.

At the outlet end of the sausage conveyor 75 of the stripping mechanism, a stationary guide trough 105 is positioned to transfer the stripped sausage and casing to the final separating and stripping rollers 106 and 107. Rollers 106 and 107 are geared by spur gearing 108, 109 and bevel gearing 110, 111 to be oppositely driven by the shaft 112, which in turn is driven by spur gearing 113 and 114 from the shaft 78 previously referred to. The stripped sausage casing is crushed and gripped to be fed between the counter rotating roller 106 and 107 into the trough 115. It will be noted that the rollers 106 and 107 are journalled on suitable supports in such manner as to be downwardly inclined towards the discharge end of the machine. Thus, the stripped and now skinless sausage is conveyed off the discharge end of the rollers 106 and 107 and separate from the stripped casing which passes into trough 115.

The source of power, which may be an electric motor, has not been shown in order to simplify the drawings. It should be understood that shafts 28, 81, 91 and 92 may be driven from an electric motor through a variable speed transmission in any suitable known manner to obtain the desired shaft rotation and speeds to cause the most effective operation of the machine. It should also be understood that the details of the machine framework and adjusting devices for the sausage sizes and casing slitter have not been shown in order to avoid complicating the drawings unnecessarily since the details of such elements will be obvious to anyone skilled in the art.

To operate the machine, a string of prepared sausage in a continuous linked casing to be stripped from the sausage is first fed through the machine by hand until the stripped casing may be crushed and fed between rollers 106 and 107. Thereafter, the machine may be operated at speed to automatically and continuously strip the casing, regardless of the varying lengths of the sausage between the casing links. As should now be readily understood, adjustments of the machine for varying sausage diameters or casing thickness, as previously described, may be readily made by raising or lowering the cutting knife 50 and its supporting frame member 16 carried by the adjustable threaded spindle 14. This application is a division of my application Serial No. 139,022, filed January 17, 1950, for Apparatus for Stripping and Removing Artificial Casing From Sausage, now Patent No. 2,644,979.

I claim:

1. In the manufacture of skinless sausage, the method of stripping an artificial casing from prepared sausage which comprises the steps of slitting the casing lengthwise of the sausage, frictionally engaging the slit casing as the casing and sausage is moved longitudinally on an inclined axis relative to the frictional engagement, to thereby strip the casing from the sausage by a cross-sweep motion between the casing and its frictional engagement, and separating the stripped casing from the sausage.

I claim:

1. In the manufacture of skinless sausage, the method of stripping an artificial casing from prepared sausage which comprises the steps of slitting the casing lengthwise of the sausage, frictionally engaging the slit casing as the casing and sausage is moved longitudinally on an inclined axis relative to the frictional engagement, to thereby strip the casing from the sausage by a cross-sweep motion between the casing and its frictional engagement, and separating the stripped casing from the sausage.

2. In the manufacture of skinless sausage, the method of stripping an artificial casing from prepared sausage which comprises the steps of compressing the casing and sausage meat to a predetermined size, slitting the casing lengthwise of the sausage while compressed, frictionally engaging the slit casing as the casing and sausage is moved longitudinally on an inclined axis relative to the frictional engagement, to thereby strip the casing from the sausage by a cross-sweep motion between the casing and its frictional engagement, and separating the stripped casing from the sausage.

3. In the manufacture of skinless sausage, the method of continuously stripping the artificial casing from a linked length of artificial casing containing a plurality of prepared sausages of indeterminate length which comprises the steps of slitting the casing lengthwise of the sausage, frictionally engaging the slit casing as the casing and sausage is moved longitudinally on an inclined axis relative to the frictional engagement, to thereby strip the casing from the sausage by a cross-sweep motion between the casing and its frictional engagement, and separating the stripped casing from the sausage.

4. In the manufacture of skinless sausage, the method of continuously stripping the artificial casing from a linked length of artificial casing containing a plurality of prepared sausages of indeterminate length which comprises the steps of compressing the casing and sausage meat to a predetermined size, slitting the casing lengthwise of the sausage while compressed, frictionally engaging the slit casing as the casing and sausage is moved longitudinally on an inclined axis relative to the frictional engagement, to thereby strip the casing from the sausage by a cross-sweep motion between the casing and its frictional engagement, and separating the stripped casing from the sausage.

References Cited in the file of this patent

UNITED STATES PATENTS 2,340,755    Jacobson  _____ Feb. 1, 1944